United States Patent

Kim

[11] Patent Number: 5,621,468
[45] Date of Patent: Apr. 15, 1997

[54] MOTION ADAPTIVE SPATIO-TEMPORAL FILTERING OF VIDEO SIGNALS

[75] Inventor: Jong-Hoon Kim, Seoul, Rep. of Korea

[73] Assignee: Daewoo Electronics Co., Ltd., Seoul, Rep. of Korea

[21] Appl. No.: 320,702

[22] Filed: Oct. 7, 1994

[51] Int. Cl.$^6$ .................................................. H04N 7/32
[52] U.S. Cl. ........................................ 348/416; 348/699
[58] Field of Search .................................. 348/384, 390, 348/396, 400–402, 407, 409–413, 415, 416, 420, 429, 607, 699; 382/232, 236, 238, 244; H04N 7/130, 7/137

[56] References Cited

U.S. PATENT DOCUMENTS

| | | |
|---|---|---|
| 4,694,342 | 9/1987 | Klees .................................. 348/607 |
| 4,745,458 | 5/1988 | Hirano et al. ........................ 348/429 |
| 4,771,331 | 9/1988 | Bierling et al. ..................... 348/396 |
| 4,873,573 | 10/1989 | Thomas et al. ..................... 348/416 |
| 5,260,782 | 11/1993 | Hui ...................................... 348/416 |
| 5,280,350 | 1/1994 | DeHaan et al. .................... 348/699 |
| 5,311,310 | 5/1994 | Jozawa et al. ..................... 348/699 |

Primary Examiner—Tommy P. Chin
Assistant Examiner—Richard Lee
Attorney, Agent, or Firm—Anderson Kill & Olick P.C.

[57] ABSTRACT

A motion adaptive spatio-temporal filtering method is employed as a prefilter in an image coding apparatus, which processes the temporal band-limitation of the video frame signals on the spatio-temporal domain along the trajectories of a moving component without temporal aliasing by using a filter having a band-limitation characteristic according to a desired temporal cutoff frequency and the velocity of moving components.

4 Claims, 6 Drawing Sheets

$V_x = 1$ PIXEL/FRAME INTERVAL $V_x = 2$ PIXELS/FRAME INTERVAL $V_x = 3$ PIXELS/FRAME INTERVAL

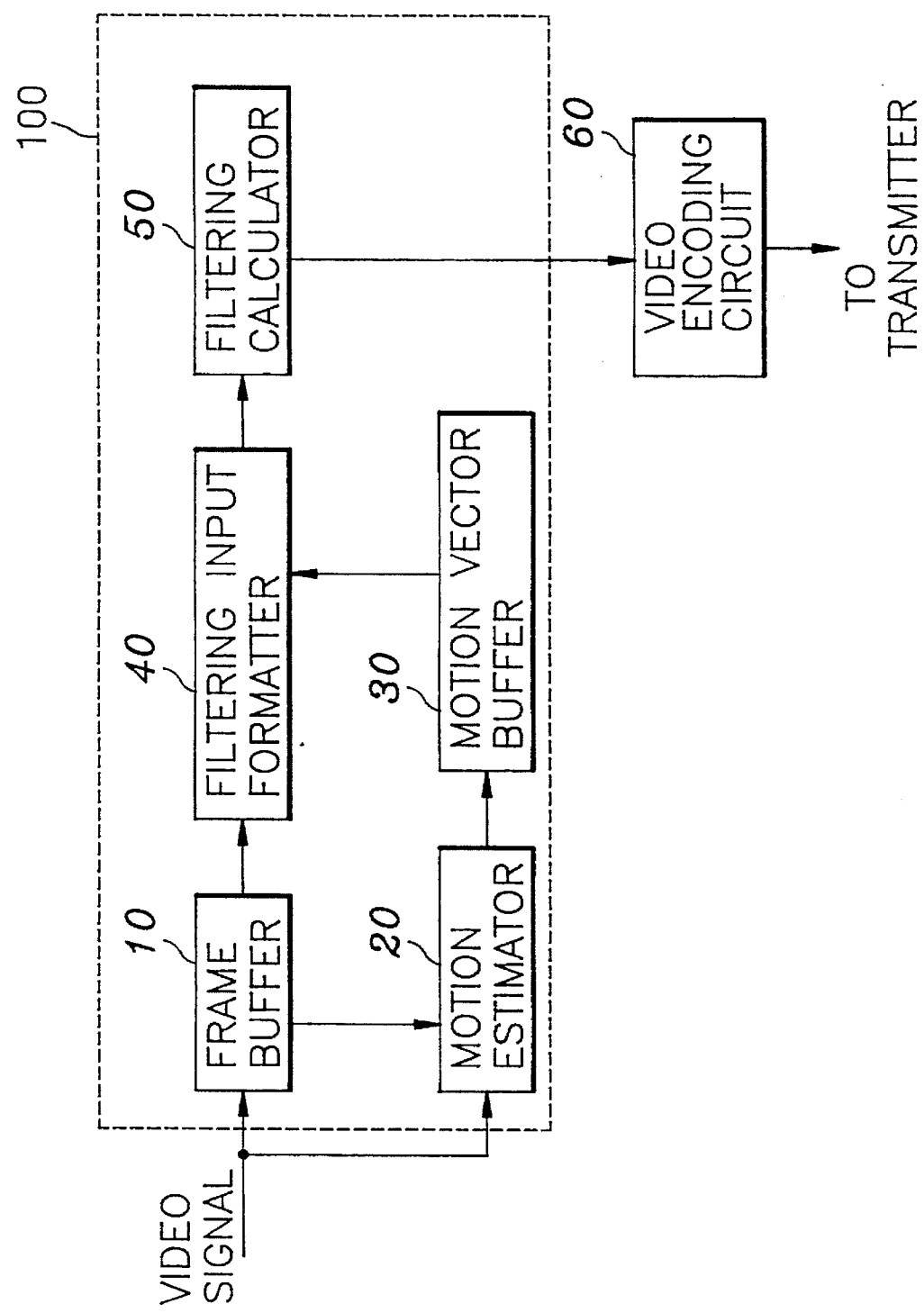

MOTION ADAPTIVE SPATIO-TEMPORAL FILTERING OF VIDEO SIGNALS

FIELD OF THE INVENTION

The present invention is directed to a method and an apparatus for the temporal filtering of video signals; and, in particular, to a motion adaptive spatio-temporal filter (MASTF) for use in an image encoding apparatus, capable of achieving a temporal band limitation without incurring temporal aliasing effects and thereby obtaining an improved picture quality.

DESCRIPTION OF THE PRIOR ART

In digital television systems such as video-telephone, teleconference and high definition television systems, an image coding apparatus has been used to reduce a large volume of data defining each frame of video signals by way of employing various data compression techniques, for example, a transform coding using a Discrete Cosine Transform, and a motion compensation coding for reducing the temporal relationship between two successive frames.

In order to effectively carry out the data compression process, most real-time image coding apparatus available in the art employ various filters as a part of a front-end processing for the filtering and frame rate reduction. These filters serve to eliminate or alleviate temporal noises and perform band limitation to thereby improve the picture quality and coding efficiency.

One of such prior art apparatus is disclosed in an article by Eric Dubois et al.,"Noise Reduction in Image Sequences Using Motion-Compensated Temporal Filtering ", *IEEE Transactions on Communications*, COM-32, No. 7 (July, 1984), which utilizes a nonlinear recursive temporal filter to reduce noise components which may arise in an initial signal generation and handling operation. This temporal filter employs a motion compensation technique to perform the filtering in the temporal domain along the trajectory of a motion to thereby reduce noise components in moving areas without modifying the details of an image.

Another prior art apparatus is described in an article by Wen-Hsiung Chen et al., "Recursive Temporal Filtering and Frame Rate Reduction for Image Coding", *IEEE Journal on Selected Areas in Communications* SAC-5 (August, 1987), which also employs a recursive temporal filter to perform a recursive filtering and frame rate reduction. This filter when applied in the temporal domain can smooth out frame-to-frame input noises and improve the picture quality.

U.S. Pat. No. 4,694,342 issued to K. J. Klees provides an apparatus which utilizes a spatial filter that can function both recursively and non-recursively for removing noises from a video image while substantially preserving the details thereof. This filter includes a lookup table for storing predefined and filtered output pixel values and predefined feedback pixel values wherein certain portions of an incoming image are filtered non-recursively to substantially preserve the image details while certain other portions of the same image are filtered recursively to remove noises therefrom.

While the above and other prior art apparatus may be capable of reducing the noises in moving areas without altering the image details through the use of a lowpass filtering technique performed along the trajectory of a motion, such approaches tend to introduce artifacts in those areas where the motion occurs in a relatively high speed. As a result, such apparatus are not equipped to adequately deal with the temporal band limitation or the visual artifacts resulting from temporal aliasing.

If the repeated spectra include the aliasing components, visual artifacts appear in the image. Especially, those moving areas comprised of spatial high frequency components may distort psychovisual effects: this is, the perceived velocity on moving areas may differ from the actual velocity. To achieve an efficient temporal band-limitation, therefore, it is desirable to have a temporal filter which is not affected by the aliasing effect.

SUMMARY OF THE INVENTION

It is, therefore, a primary object of the present invention to provide a motion adaptive spatio-temporal filtering method capable of effectively performing temporal band-limitation of a video signal without incurring temporal aliasing and thereby improving the picture quality.

In accordance with the present invention, there is provided a method for filtering a video signal with a predetermined temporal cutoff frequency to achieve a temporal band-limitation thereof, wherein said video signal includes a multiplicity of frames each of which having a multiple number of pixels, the method for obtaining filtered result for a target pixel in a target frame in the video signal which comprises the steps of:

estimating a multiplicity of motion vectors each of > which represents the movement at the target pixel position in each frame of the video signal;

determining, as a filtering input function, a multiplicity of groups of pixel values on trajectories of the target pixel wherein each of the groups is determined on the trajectory of the target pixel in a corresponding frame through the use of the motion vector for the frame; and performing a convolution of the filtering input function with a predetermined filter impulse response, thereby obtaining a filtered video signal which has the predetermined temporal bandwidth without temporal aliasing.

BRIEF DESCRIPTION OF THE DRAWINGS

The above and other objects and features of the instant invention will become apparent from the following description of preferred embodiments taken in conjunction with the accompanying drawings, in which:

FIG. 5 is a schematic block diagram representing an image coding apparatus employing the motion adaptive spatio-temporal filtering method in accordance with a preferred embodiment of the present invention.

DETAILED DESCRIPTION OF THE PREFERRED EMBODIMENTS

A video signal may be treated in terms of its 3-dimensional, i.e., horizontal, vertical and temporal components;

and described as a continuous function $f_3(x,y,t)$. Assuming that its moving objects have only a constant-velocity rigid translational motion $v=(v_x,v_y)$, the Fourier transform of the continuous video signal, $F_3(\cdot)$, may be represented as follows:

$$F_3(f_x, f_y, f_t) = F_2(f_x, f_y) \cdot \delta(f_x v_x + f_y v_y + f_t) \qquad \text{Eq. (1)}$$

wherein $F_2(f_x, f_y)$ is the Fourier transform of a 2-dimensional video signal $f_2(x,y)$, and $\delta(f_x v_x + f_y v_y + f_t)$ represents a tilted plane in a 3-Dimensional frequency space described by the equation $f_x v_x + f_y v_y + f_t = 0$ so that the baseband exists only on a 2-Dimensional frequency plane. Eq. (1) is disclosed in, e.g., an article by R. A. F. Belfor, et al., "Motion Compensated Subsampling of HDTV", *SPIE*, 1605, *Visual Communications and Image Processing '91*, pp 274–284 (1991). From the location of a baseband spectrum, a spatio-temporal bandwidth can be anticipated. That is, if a temporal bandwidth $f_t^w$ is given, the relationship among the temporal bandwidth $f_t^w$, the spatial bandwidth $f_x^w$ and $f_y^w$, and the velocity components $v_x$ and $v_y$ is obtained from Eq. (1) as follows:

$$f_t^w = f_x^w \cdot v_x + f_y^w \cdot v_y \qquad \text{Eq. (2)}$$

wherein $f_x^w$ and $f_y^w$ are the respective spatial bandwidth components in x and y directions. From Eq. (2), it can be seen that the temporal bandwidth is proportional to the velocity of the moving objects; and when the temporal bandwidth is fixed, the spatial bandwidth becomes inversely proportional to the velocity of the moving object.

Since the video signal for the filtering is sampled with a spatial and temporal sampling frequencies, the sampled video signal is represented as 3-Dimensional sampled data, i.e., pixels. Therefore, sampling of the continuous function $f_3(\cdot)$ may be expressed by multiplying the continuous function $f_3(x,y,t)$ with a 3-Dimensional array of delta functions. A spectrum distribution of the pixels may be then given by the convolution of Fourier transform of $f_3(\cdot)$ and a delta function. As a result, the spectrum of the pixels is replicated at intervals of the sampling frequencies by the characteristics of the delta function.

Figure 1A:
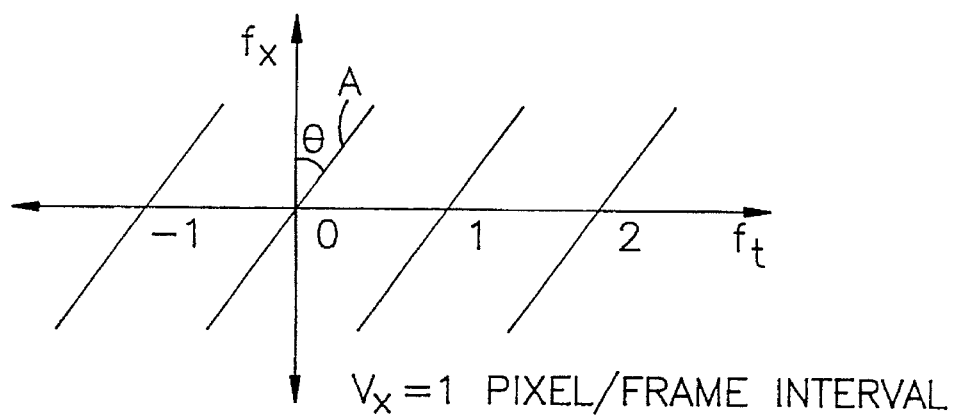
FIGS. 1A, 1B and 1C are diagrams illustrating base-band spectrum distributions as a function of the velocity of a moving object.
Figure 1B:
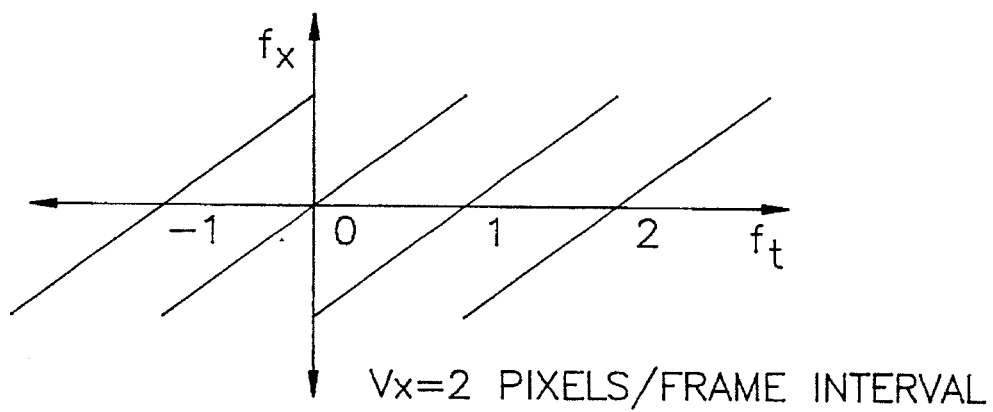
Figure 1C:
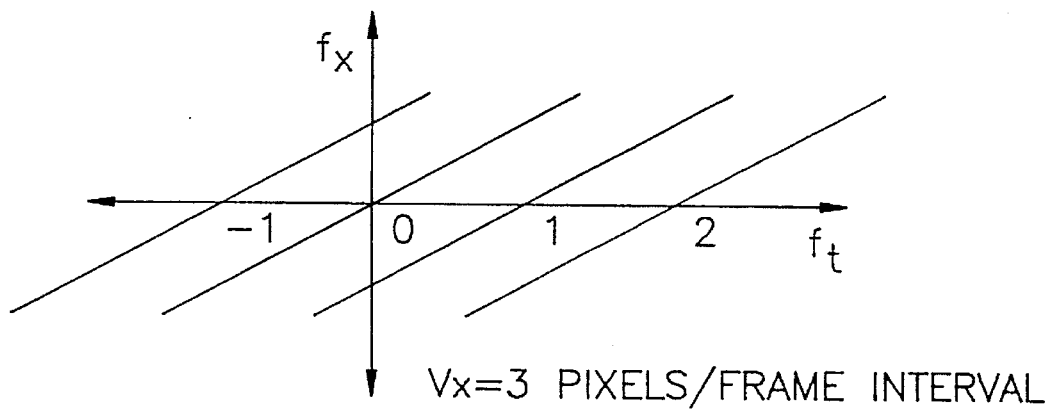

Referring first to FIGS. 1A, 1B, and 1C, there are shown baseband spectrum distributions as a function of the velocity of a moving object $v_x=1$ pixel/frame interval, $v_x=2$ pixels/frame interval and $v_x=3$ pixels/frame interval, wherein solid lines indicate the replicas of a baseband; and the temporal sampling frequency is normalized to 1; and the spatial (x axis direction) and temporal frequencies are designated as $f_x$ and $f_t$, respectively.

The motion of a pixel A in the moving object causes the spectrum to become skewed from the spatial frequency axis as shown in FIG. 1A. As shown in FIGS. 1A, 1B and 1C, the angle $\theta$ of said skewing increases as does the velocity. From Eq. (2), the reason for the skewing can be readily understood by considering the temporal frequency at a pixel in the video signal: since the spectrum distribution on the spatio-temporal frequency domain is related to the product of the spatial frequency and the speed of the moving object, a higher velocity of the moving object gives rise to a higher temporal frequency. It should be stressed that the spectrum is skewed and not rotated.

Figure 2:
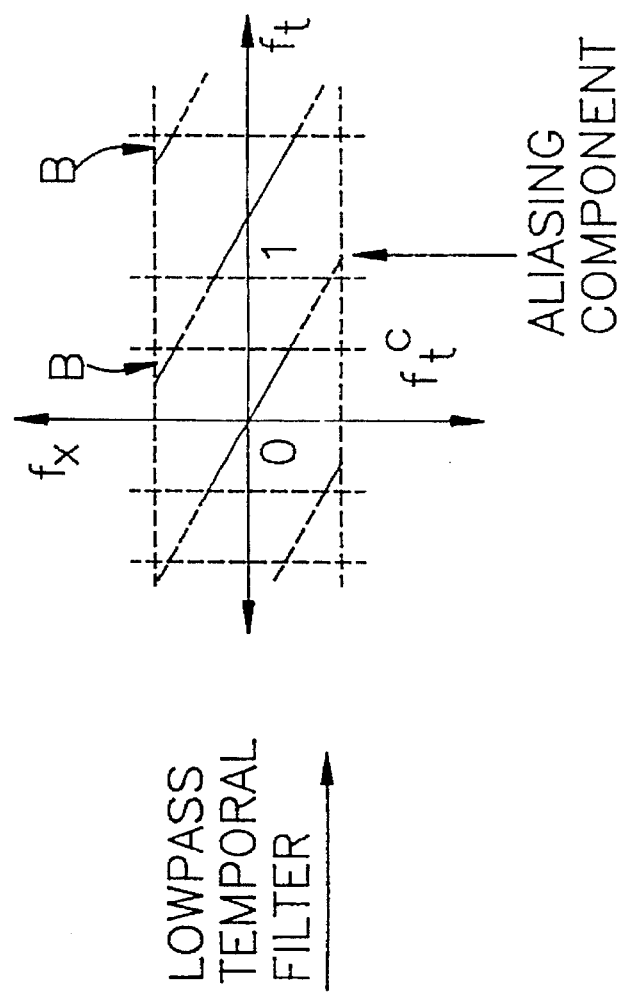
FIG. 2 is a diagram depicting a result of the conventional lowpass filtering in the temporal domain with a fixed temporal cutoff frequency.
Figure 2:
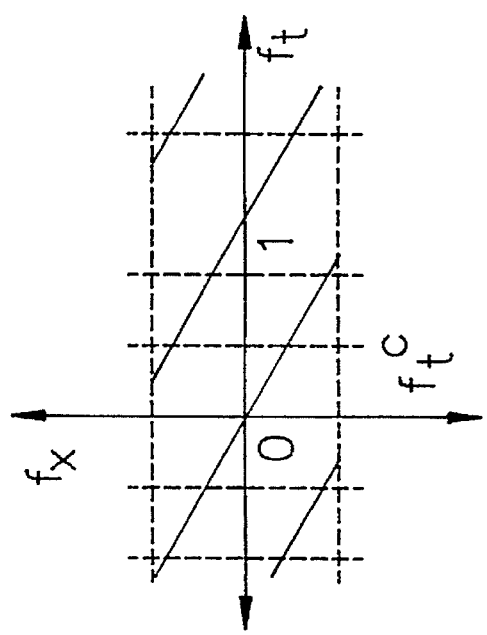

Referring to FIG. 2. results of lowpass filtering in the temporal domain with a fixed temporal cutoff frequency $f_t^c$ are illustrated. In order to perform the temporal filtering, two assumptions may be made as follows: first, baseband spectrum has no spatial aliasing components, and secondly, for the sake of simplicity, therm exists only purely horizontal motion (represented in terms of $f_x$) with a constant velocity. In FIG. 2, the filtered result contains, e.g., spatial high frequency components B of adjacent spectra which represent temporal aliasing. That is, the spatial high frequency components affect the temporal low frequency components of the adjacent replicas. In other words, a disturbance between the spatial high frequency components and the low frequency ones of the adjacent replicas appears in the displayed image.

As may be seen from Eqs. (1) and (2), the relation between the spatial (including the vertical and the horizontal components) and temporal frequencies $f_s$ and $f_t$ are represented as follows:

$$f_s = \frac{1}{|v|} \cdot f_t \qquad \text{Eq. (3)}$$

wherein the spatial frequency $f_s$ is defined on $f_x$-$f_y$ plane. As is seen from Eq. (3), it should be appreciated that, when the temporal cutoff frequency is fixed in order to limit the temporal bandwidth, the spatial cutoff frequency becomes inversely proportional to the absolute value of the velocity of the moving object.

Assuming that $h(\cdot)$ is an impulse response of a lowpass temporal filter and, for simplicity, there exists only a purely horizontal motion (x axis direction), then the temporal band-limited video signal $g(x,t)$ may be represented as follows:

$$g(x,t) = \int_{-\infty}^{\infty} h(\tau) \cdot f(x, t-\tau) d\tau \qquad \text{Eq. (4)}$$

wherein a linear phase filter is used to reduce the effect of a group-delay of a filter response. From the assumption of constant-velocity rigid translational motion $v=(v_x, v_y)$ and purely horizontal motion, a filtering input function may be represented as follows.

$$f(x,t-\tau) = f(x+v_x\tau, t) \qquad \text{Eq. (5)}$$

From Eq. (5), the displacement of the moving pixel along the temporal frequency axis can be represented by its trajectory in the spatial domain at a point on the temporal axis. Thus, Eq. (4) may be rewritten as:

$$g(x,t) = \int_{-\infty}^{\infty} h(\tau) \cdot f(x+v_x\tau, t) d\tau \qquad \text{Eq. (6)}$$

On the other hand, in case of a real video signal the assumption of constant-velocity ligid translational motion is not always valid. Furthermore, in the case that there is no moving object, each pixel value of the video data signal vary with the time due to, e.g., changes in lighting source and characteristics of video signal generating device such as a video camera. In such cases, Eq. (5) holds true only for a short period of time and can be rewritten as:

$$f(x, t-(k+1)\Delta t) = f(x+v_x)(t-k\Delta t) \cdot \Delta t, \ t-k\Delta t) \qquad \text{Eq. (7)}$$

wherein $\Delta t$ denotes a short period of time, e.g., a frame interval and k is an integer. In accordance with Eq. (7), the equation (6) can be rewritten as:

$$g(x,t) = \qquad \text{Eq. (8)}$$

$$\sum_{k=-\infty}^{\infty} \int_{k\Delta t}^{(k+1)\Delta t} h(\tau)f(x+v_x(t-k\Delta t)\cdot(\tau-k\Delta t), t-k\Delta t)d\tau$$

From Eq. (8), it can be appreciated that the temporal filtering of Eq. (4) can be achieved by spatio-temporal filtering with its filtering input function f(·).

Eq. (8) is a continuous description of the motion adaptive spatio-temporal filtering. Similar results hold in the discrete case: the integral is replaced by summation and $d\tau$ is represented by $\Delta\tau$ and j. Eq. (8) is then given by $$g(x,n) = \qquad \text{Eq. (9)}$$

$$\sum_{j=-N}^{N} \left\{ \sum_{l=0}^{L-1} h(Lj+l) \cdot f(x+v(x,n-j) \cdot \Delta\tau \cdot l, n-j) \right\}$$

wherein n is a frame index; the velocity and the filtering positions are replaced by vectors v and x; filter impulse response h(·) comprising (2N++1)×L filter coefficients is predetermined in conjunction with the temporal cutoff frequency and the predetermined numbers N, L(N,L are positive integers); and if we denote a pixel-to-pixel interval as $\Delta x$, $\Delta\tau$ is selected to satisfy $|v(\cdot)\cdot\Delta\tau| \leq |\Delta x|$ (If $\Delta\tau$ fails to satisfy the condition, it may cause spatial aliasing).

Therefore, as may be seen from Eq. (9), the temporal band-limitation can be achieved by spario-temporal filtering, i.e., lowpass filtering of the filtering input function taken from both spatial and temporal domains.

On the other hand, if $\Delta T$ is a frame to frame interval, then $L\Delta\tau$ is equal to $\Delta T$ and $v(\cdot)\cdot\Delta T$ is equal to $D(\cdot)$ which is a motion vector representing a displacement of a pixel between two neighboring frames. Then, Eq.(9) can be modified as follows:

$$g(x,n) = \qquad \text{Eq. (10)}$$

$$\sum_{j=-N}^{N} \left\{ \sum_{l=0}^{L-1} h(Lj+l) \cdot f\left(x + D(x, n-j) \cdot \frac{l}{L}, n-j\right) \right\}$$

wherein L is selected to satisfy $|D(\cdot)| \leq |\Delta x| \cdot L$ (This condition is equivalent to the condition $|v(\cdot)\cdot\Delta\tau| \leq |\Delta x|$ described earlier, therefore if L fails to satisfy this condition, it may cause spatial aliasing). Eq. (10) is an implementation of Eq. (9). The temporal band-limitation is achieved by spatio-temporal filtering, i.e., lowpass filtering on the filtering input function f(·) which comprises a multiplicity of, e.g., (2N+1), groups of filtering input data wherein each group includes a predetermined number of, e.g, L filtering input data which are obtained from pixel values of corresponding frame in the video signal. In Eq. (10), (x+D(x, n−j)·l/L) which denotes a position of filtering input data in (n−j)th frame of the video signal, may not coincide with exact pixel positions. In that case, the filtering input data can be determined from adjacent pixels located around the position by using, e.g., bilinear interpolation method which determines a weighted sum of the adjacent pixel values as the filtering input data. That is, the filtering input function is obtained on the spario-temporal domain along the trajectories of moving object. Specifically, a group of input data included in the filtering input function f(·) may be determined from the pixel values of a corresponding frame using the motion vector which represents the displacement of the moving object between the frame and its previous frame in the video signal as will be described in conjunction with FIG. 3.

On the other hand, the filter impulse response comprising a plurality, i.e., (2N+1)×L, of filter coefficients serves to limit the bandwidth of the video signal to a predetermined bandwidth. These filter coefficients may be predetermined based on a desired temporal cutoff frequency and a predetermined numbers N and L. For example, when the temporal cutoff frequency is $f_t^c$, the filter impulse response is designed with a spatio-temporal cutoff frequency of $f_t^c/L$.

Actually, as may be seen from Eq. (10), the filtered data g(·), i.e., band-limited data, is obtained by convolving each group of filtering input data with corresponding filter coefficients and by summing each group of filtered input data.

Figure 3:
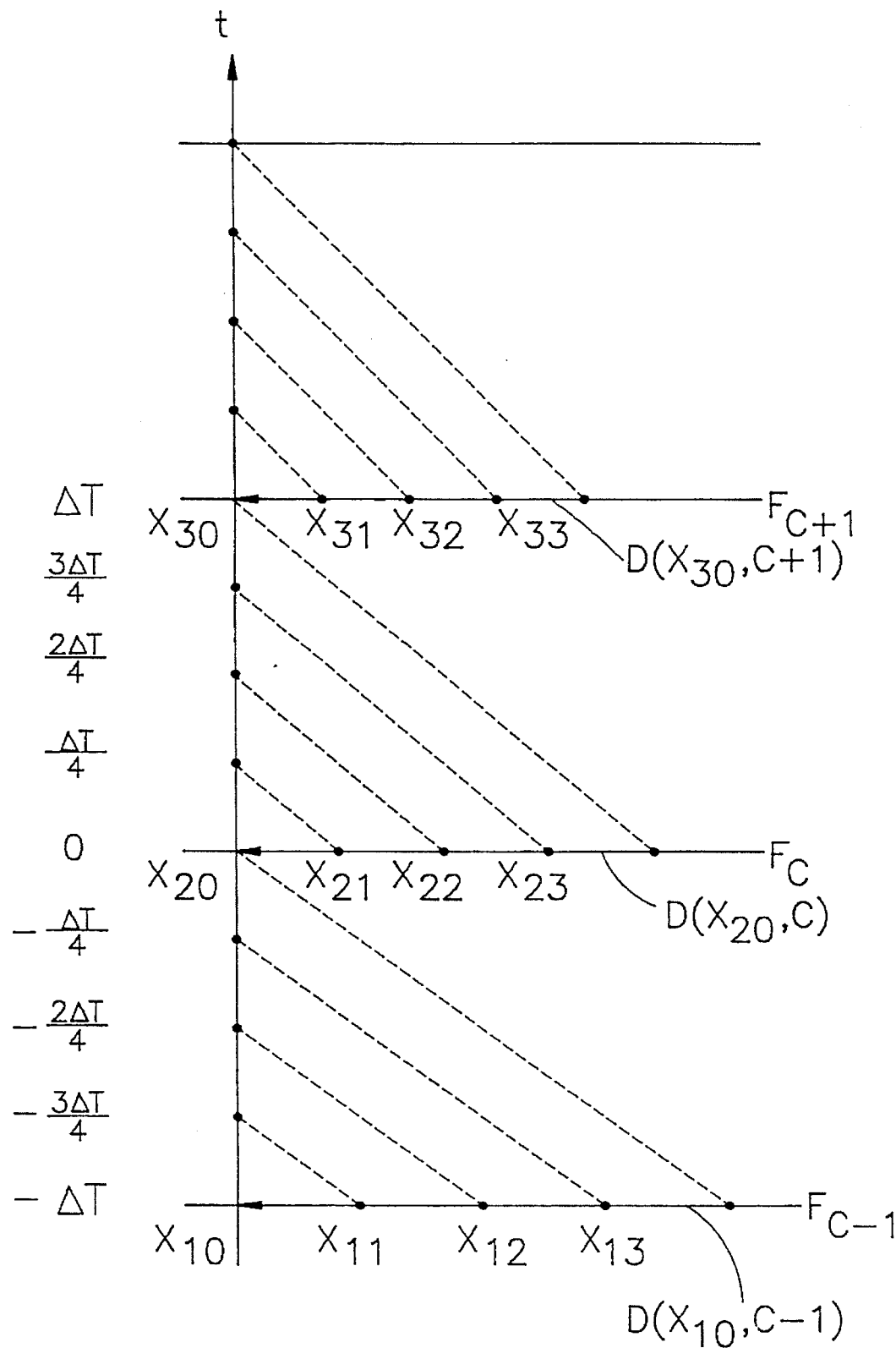
FIG. 3 is a diagram for illustrating a filtering input function in the spatio-temporal domain.

Referring to FIG. 3, there is shown an explanatory diagram illustrating the filtering input function for the motion adaptive spatio-temporal filtering method of the present invention. For the sake of simplicity, each frame is denoted as a line, e.g., $F_{c-1}$, $F_c$ and $F_{c+1}$, and N and L of Eq. (10) are assumed to be 1 and 4, respectively. In other words, to obtain the filtered data for a target pixel in a target frame $F_c$, three filtering input frames, i.e., the target frame $F_c$ containing the target pixel to perform filtering operation thereon and its two neighboring frames $F_{c-1}$, $F_{c+1}$, are used for the filtering process wherein c−1, c, and c+1 denote frame indices; and four filtering input data are determined on each filtering input frame based on the motion vector for the pixel at the target pixel position in its subsequent frame. The position of the target pixel is denoted as $x_{10}$, $x_{20}$ and $x_{30}$ in the frames $F_{c-1}$, $F_c$ and $F_{c+1}$, respectively, and the vertical axis is a time axis.

In order to obtain the filtered data for the target pixel at $x_{20}$ in the target frame $F_c$, a multiplicity of, i.e., three, groups of filtering input data are decided, each group including a predetermined number, e.g., 4, of filtering input data located on the corresponding motion trajectory for the target pixel in the corresponding filtering input frame. Specifically, three groups of filtering input data positioned at $(x_{10}, X_{11}, X_{12}, X_{13})$, $(x_{20}, X_{21}, X_{22}, x_{23})$ and $(x_{30}, x_{31}, x_{32}, x_{33})$ are determined on the trajectories of the pixels at the target pixel position based on the motion vectors $D(x_{10}, c-1)$, $D(x_{20}, c)$ and $D(x_{30}, c+1)$ in the frames $F_{c-1}$, $F_c$ and $F_{c+1}$, respectively.

As shown in FIG. 3, it is readily appreciated that the filtering input data are equivalent to the target pixel values in temporally interpolated or upsampled frames of the video signal. For instance, the filtering input data at $x_{11}$ in the frame $F_{c-1}$ is equivalent to the pixel value at $x_{10}$ at time $t=-3\Delta T/4$. That can be denoted as:

$$f\left(x_{10} + D(x_{10}, -\Delta T) \cdot \frac{1}{4}, -\Delta T\right) = f\left(x_{10}, -\frac{3}{4}\Delta T\right) \qquad \text{Eq. (11)}$$

The equivalence between the spatial domain and the time domain is denoted as dotted line in FIG. 3.

Figure 4A:
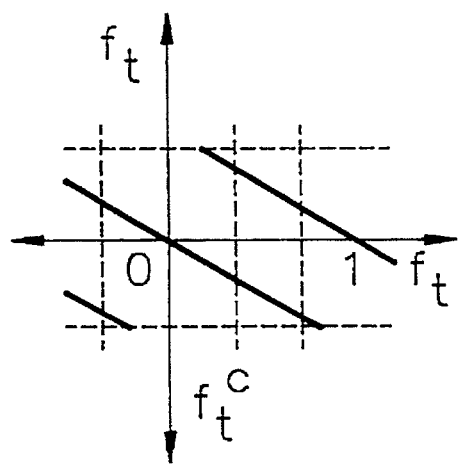
FIGS. 4A to 4D illustrate the result of the motion adaptive spatio-temporal filtering in accordance with the present invention.
Figure 4B:
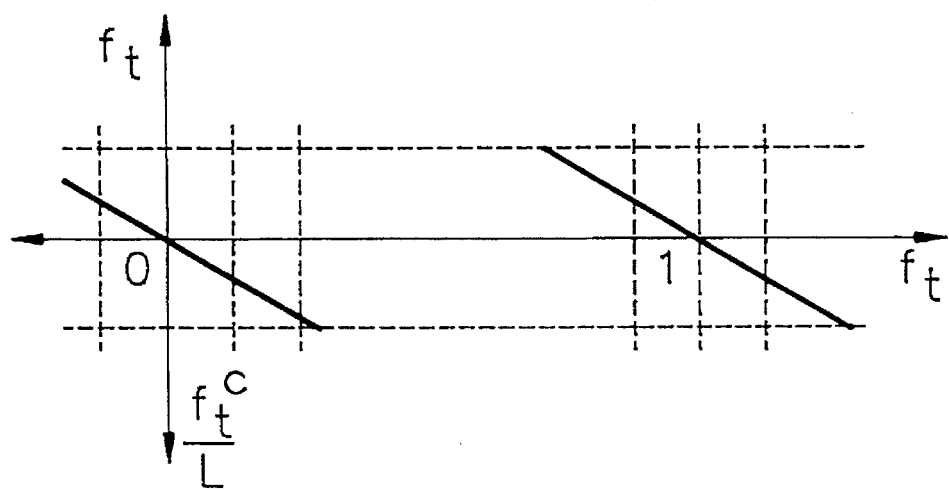
Figure 4C:
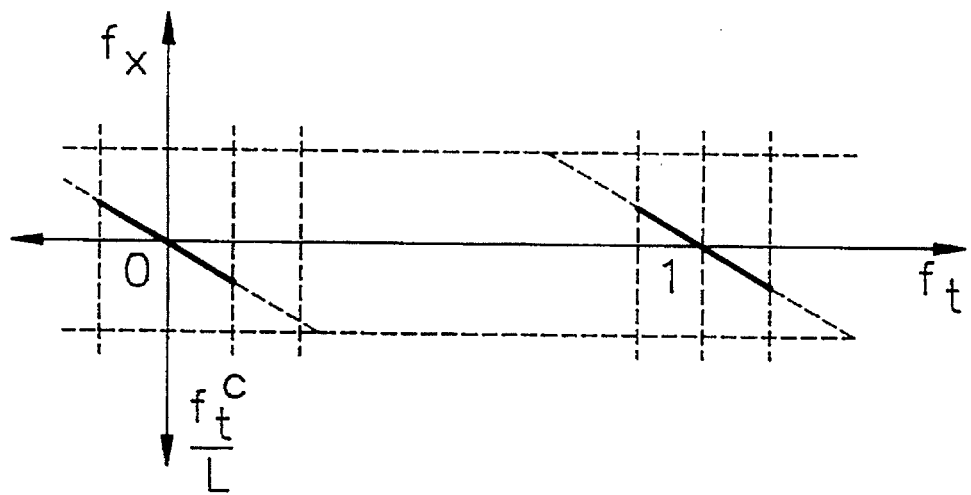
Figure 4D:
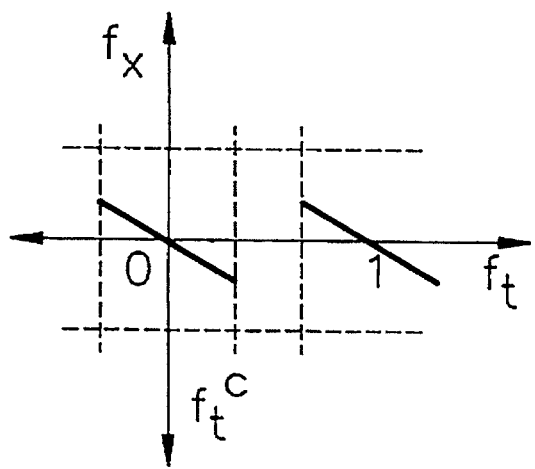

Referring now to FIGS. 4A to 4D, there is shown the result of the lowpass temporal filtering of the video signal on a spatio-temporal domain through the use of the motion adaptive spario-temporal filtering method. In FIG. 4A, there is shown a baseband spectrum of the original video signal. As described above, the process of obtaining each group of filtering input data is equivalent to temporal upsampling or interpolating as illustrated in FIG. 4B. If the desired cutoff frequency of the temporal lowpass filtering is $f_t^c$, the spatio-temporal cutoff frequency $f_c$ of the filter of the present invention is $f_t^c/L$ as shown in FIG. 4C. The final spectra for the filtered results are shown in FIG. 4D which are the subsampled versions of the spectra in FIG. 4C (note that the filtered results are not provided for the interpolated frames). Comparing with the temporal band-limitation depicted in FIG. 2, it should be readily appreciated that the spatio-temporal band-limitation of the present invention is not affected by temporal aliasing components.

As may be seen from the Eq. (10) and FIGS. 3, 4A, 4B, 4C, and 4D, it should be appreciated that the filtering operation is performed on a spario-temporal domain along the trajectory of moving objects to thereby achieve a temporal band limitation. Therefore, the temporal aliasing, which may occur in the repeated Spectra when the velocity of the moving objects is increased, can be effectively eliminated by the inventive filter to thereby greatly reduce the visual artifacts appearing in the moving areas in the image.

Referring now to, FIG. 5, there is shown an image coding apparatus employing the motion adaptive spatio-temporal filter in accordance with a preferred embodiment of the present invention. The image coding apparatus comprises a filtering circuit 100 for performing the motion adaptive spatio-temporal filtering in accordance with the present invention and a video encoding circuit 60 for eliminating redundancies in the filtered video signal in order to compress the video signal to a more manageable size for the transmission thereof. The video signal is generated from a video signal source, e.g., video camera(not shown), and fed to the filtering circuit 100.

The filtering circuit 100 performs the motion adaptive spatio-temporal filtering operation, as previously described, in accordance with Eq. (10). The filtering circuit 100 includes a frame buffer 10, a motion estimator 20, a motion vector buffer 30, a filtering input formatter 40 and a filtering calculator 50. The frame buffer 10 stores a current frame which is being inputted to the filtering circuit 100 and a multiplicity of, e.g., (2N+1), previous frames, i.e., filtering input frames to be used in a filtering procedure. Specifically, assuming that N=1, the frame buffer 10 stores the current frame $F_{c+2}$ and three filtering input frames $F_{c-1}$, $F_c$ and $F_{c+1}$, wherein $F_{c+2}$, c+1, c, and c−1 are frame indices. The motion estimator 20 receives two successive frames of the video signal, i.e., the current frame $F_{c+2}$ of the video signal inputted directly from the video signal source and its previous frame $F_{c+1}$ stored in the frame buffer 10, and extracts motion vectors associated with each of the pixels included in the current frame $F_{c+2}$. In order to extract motion vectors, various motion estimation method, as well known in the art, may be employed (see, e.g., MPEG Video Simulation Model Three, International Organization for Standardization, Coded Representation of Picture and Audio Information, 1990, ISO-IEC/JTC1/SC2/WG8 MPEG 90/041).

The extracted motion vectors are coupled to the motion vector buffer 30 to be stored therein. In accordance with the present invention, the motion vector buffer 30 stores motion vectors for the frames $F_{c+2}$, $F_{c+1}$, $F_c$ and $F_{c-1}$.

The filtering input frames stored in the frame buffer 10 and the motion vectors associated with the filtering input frames stored in the motion vector buffer 30 are coupled to the filtering input formatter 40. The filtering input formatter 40 determines a multiplicity, e.g., 3, of groups of filtering input data which constitute the filtering input function f(·) in Eq. (10). As described above, in case filtering input data is determined to be located at a position which does not fall on the exact pixel position, the filtering input formatter 40 provides the filtering input data by calculating a weighted sum of the four neighboring pixels thereof. The filtering input data are coupled to the filtering calculator 50.

At the filtering calculator 50, the filtered data g(·) is calculated as represented by Eq. (10) using the filtering input data inputted from the filtering input formatter 40.

The filter impulse response comprising a plurality of, e.g., (2N+1)×L, filter coefficients is determined according to the desired temporal cutoff frequency $f_t^c$, N and L which are predetermined so as to satisfy the condition described earlier in conjunction with Eq. (10) by considering the characteristics of the video signal. The filter coefficients may be predetermined prior to the filtering process and stored in the filtering calculator 50. As described above, the filtering circuit 100 performs the motion adaptive spario-temporal filtering operation to thereby obtain a temporal band-limited video signal.

The filtered video signal outputted from the filtering calculator 50 is coupled to the video encoding circuit 60 wherein the video signal is compressed by various method known in the art (see, e.g., MPEG Video Simulation Model Three, International Organization for Standardization, Coded Representation of Picture and Audio Information, 1990, ISO-IEC/JTC1/SC2/WG8 MPEG 90/041). The encoded video signal is coupled to a transmitter for the transmission thereof.

While the present invention has been shown and describe with reference to the particular embodiments, it will be apparent to those skilled in art that many changes and modifications may be made without departing from the spirit and scope of the invention as defined in the appended claims.

What is claimed is:

1. An apparatus for providing a filtered data for each of pixels of a video signal by filtering the video signal with a predetermined temporal cutoff frequency to achieve a temporal band limitation thereof, wherein said video signal comprises a multiplicity of filtering input frames which include a target frame to perform a filtering operation thereon and a predetermined number of preceding frames and subsequent frames of said target frame, each of the filtering input frames having a multiple number of pixels, comprising:

means for estimating a plurality of motion vectors each of which represents the movement for each of the pixels included in the video signal;

means for determining a filtering input function for a target pixel included in the target frame, wherein the filtering input function includes a multiplicity of groups of filtering input data; each group of the filtering input data is determined on a trajectory of a pixel at the target pixel position in each of the multiplicity of filtering input frames based on a motion vector of the pixel at the target pixel position;

means for performing a convolution of the filtering input function with a filter impulse response determined according to a spatio-temporal cutoff frequency $f_c$ which is represented as:

$$f_c = \frac{f_t^c}{L}$$

wherein $f_t^c$ is the temporal cutoff frequency; and L is a predetermined positive integer related to the velocity of a moving object in the video signal, thereby obtaining filtered data for the target pixel in the target frame.

2. The apparatus of claim 1, wherein said filtered data is represented as follows:

$$g(x,n) = \sum_{j=-N}^{N} \left( \sum_{l=0}^{L-1} h(Lj+l) \cdot f\left( x + D(x, n-j) \cdot \frac{1}{L}, n-j \right) \right)$$

wherein x is the position of the target pixel; n is the index of the target frame in the video signal; the filter impulse response h(·) includes (2N+1)×L filter coefficients; j is a index whose absolute value is not greater than N; N, L are positive integers; and D(·) is a motion vector representing a motion for the target pixel.

3. A method for providing a filtered data for a target pixel in a video signal by filtering the video signal with a predetermined temporal cutoff frequency to achieve a temporal band limitation thereof, wherein said video signal comprises a multiplicity of filtering input frames which include a target frame having the target pixel therein and a predetermined number of preceding frames and subsequent frames of said target frame, each of the filtering input frames having a multiple number of pixels, comprising the steps of:

estimating a multiplicity of motion vectors each of which represents the movement for each of the pixels at the target pixel position in each frame of the video signal;

determining a filtering input function for the target pixel, wherein the filtering input function includes a multiplicity of groups of filtering input data; each group of the filtering input data is determined on a trajectory of a pixel at the target pixel position in each of the multiplicity of filtering input frames based on a motion vector of the pixel at the target pixel position; and performing a convolution of the filtering input function with a filter impulse response determined according to a spatio-temporal cutoff frequency $f_c$ which is represented as:

$$f_c = \frac{f_t^c}{L}$$

wherein $f_t^c$ is the temporal cutoff frequency; and L is a predetermined positive integer related to the velocity of a moving object in the video signal, thereby obtaining filtered data for the target pixel in the target frame.

4. The method of claim 3, wherein said filtered data is represented as follows:

$$g(x,n) = \sum_{j=-N}^{N} \left( \sum_{l=0}^{l=L-1} h(Lj+l) \cdot f\left( x + D(x, n-j) \cdot \frac{1}{L}, n-j \right) \right)$$

wherein x is the position of the target pixel; n is the index of the target frame in the video signal; the filter impulse response h(·) includes (2N+1)×L filter coefficients; j is a index whose absolute value is not greater than N; N, L are positive integers; and D(·) is a motion vector representing a motion for the target pixel.

* * * * *